United States Patent [19]

Glass

[11] 4,103,875
[45] Aug. 1, 1978

[54] SPEAR POINTS FOR FENCE STRUCTURE AND METHOD

[76] Inventor: Carl R. Glass, 2749 N. Orange Blossom Trail, Kissimmee, Fla. 32741

[21] Appl. No.: 728,708

[22] Filed: Oct. 1, 1976

Related U.S. Application Data

[63] Continuation of Ser. No. 612,521, Sep. 11, 1975, abandoned.

[51] Int. Cl.² .................................................. E04H 17/14
[52] U.S. Cl. ................................................................ 256/59
[58] Field of Search ..................... 256/59, 21, 22, 24; 403/334, 333

[56] References Cited

U.S. PATENT DOCUMENTS

| 271,196 | 1/1883 | Devoe | 256/59 X |
| 2,431,546 | 11/1947 | Edwards | 256/21 |
| 3,319,328 | 5/1967 | Fingers et al. | 256/24 |
| 3,482,125 | 12/1969 | Fleckenstein | 256/24 |

FOREIGN PATENT DOCUMENTS 109,747  2/1940  Australia ................................. 403/334

*Primary Examiner*—Doris L. Troutman
*Attorney, Agent, or Firm*—Sughrue, Rothwell, Mion, Zinn and Macpeak

[57] ABSTRACT

A fence comprises a series of vertical metallic posts connected by horizontal stringers, the posts having rectangular top portions. A non-metallic spear point is provided for each post, the spear points having assembly chambers whereby they fit about the top portions of the posts. The chamber walls are inclined to produce a wedge fit.

In an assembly method hereof the top portions are supplied with a mastic, and the spear points driven on thereafter to produce a permanent bond.

1 Claim, 3 Drawing Figures

SPEAR POINTS FOR FENCE STRUCTURE AND METHOD

This is a Continuation of application Ser. No. 612,521, filed 9/11/75, now abandoned.

BACKGROUND OF THE INVENTION

1. Field of the Invention

This invention relates to fence construction, particularly to that type of fence assembly fabricated from iron or other metals and having protective and decorative top members.

2. Statement of the Prior Art

Prior proposals for spear points, including those dealing with non-metallic fence tops are illustratively shown in the below listed prior U.S. patents.

| U.S. Pat. No. | Patentee | Issued |
| --- | --- | --- |
| Des. 74,964 | Crawford | Apr. 24, 1928 |
| Des. 80,719 | Blake | Mar. 18, 1930 |
| Des.179,832 | Youngworth | Mar. 5, 1957 |
| Des.183,146 | Savin | Jly. 1, 1958 |
| Des.186,379 | Ross | Oct. 20, 1959 |
| 303,728 | Hanika | Aug. 19, 1884 |
| 479,123 | Loughlin | Jly. 19, 1892 |
| 892,069 | Moore et al. | Jne. 30, 1908 |
| 1,409,155 | Covan | Mar. 14, 1922 |
| 3,250,050 | Finger et al. | May 10, 1966 |

SUMMARY OF THE INVENTION

This invention contemplates the provision of spear points for ornamental iron grills and rails, said spear points being formed of molded, high impact plastics. These spear points are used in lieu of conventional metallic points.

The employment of non-metallic spear points results in numerous advantages over conventional methods of assembly of fences and the like. The conventional attachment methods for metallic spear points involves welding procedures which are costly and which produce an outfall of unsightly metals necessitating expensive cleaning-up procedures. The plastic spear points are substantially reduced in weight by comparison to metal thereby effecting economy in transportation, and the plastic points are uniform in appearance and size.

The plastic spear points are cast in color conforming to that of the fence, or may be painted to resemble the fence.

DESCRIPTION OF THE PREFERRED EMBODIMENT

Figure 1:
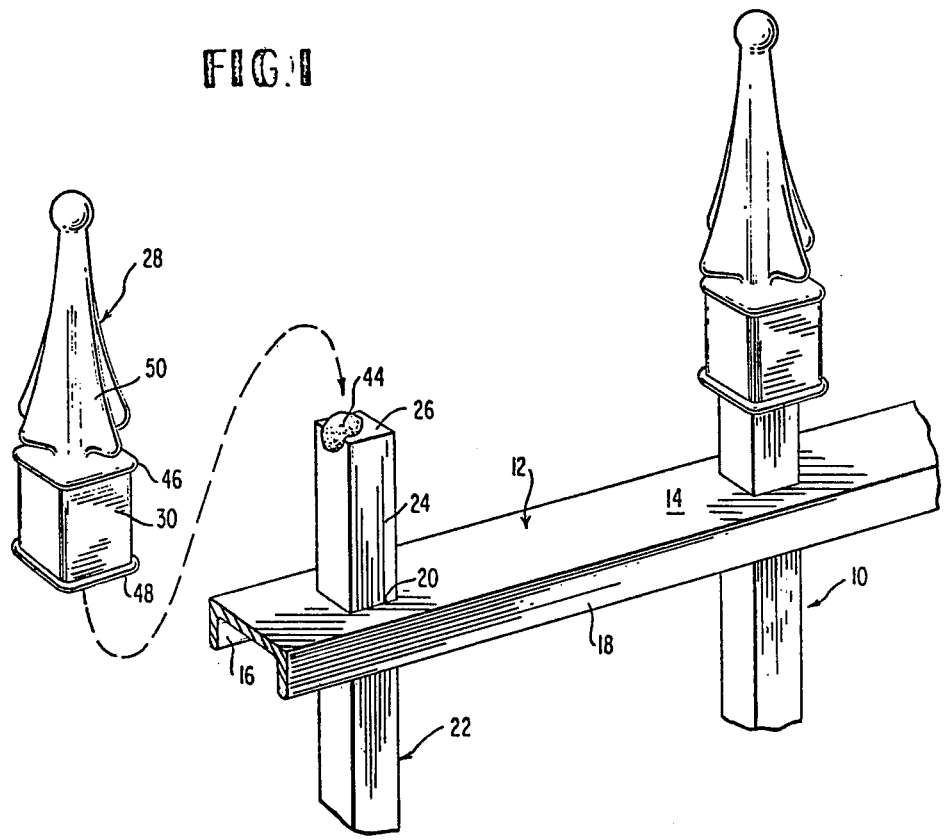
FIG. 1 is a perspective view of a section of fence, partially disassembled, showing plastic spear points according to this invention.

Referring to the drawings in more detail, in FIG. 1 a fence 10 is shown having a series of longitudinal stringers comprising metallic channel members 12. Each of the channel members has a bight portion 14 and side arms 16, 18, and the bight portion has longitudinally spaced openings 20 formed therein at regular intervals.

It will be understood that other stringers or base components, forming no part of this invention, are provided.

Projecting upwardly through the openings 20 are a plurality of posts or pickets 22. Each of the posts is of substantially rectangular cross section and occupies one of the openings, and has an upper side portion 24 which extends above the stringer. The upper side portions terminate at horizontal top walls 26.

The molded plastic spear points of this invention are designated in the drawing by reference character 28. Each of the spear points has a lower body section 30 with a solid upper portion 32, and a lower portion 34. Formed in the lower portion 34 and opening on the bottom wall 36 thereof is a tapered chamber 38. Chamber 38 is defined by inwardly inclined inner walls 40 and a flat top wall 42.

Figure 2:
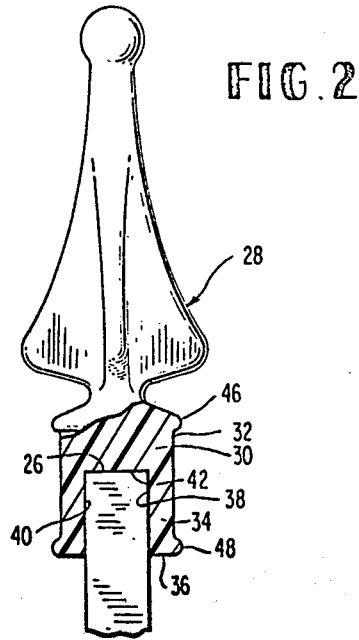
FIG. 2 is an enlarged side elevational view, partially broken away for disclosure of details.

The dimension of the chamber at its open lower end generally approximates the tops of the posts. The spear points are adapted for very tight frictional engagement on the post upper ends. The points are attached as by driving the chambers about the posts with a mallet or other tool to the extent that the top wall 42 of the chamber seats flush against the top 26 of the post. The plastic material or fabrication permits the chamber walls to expand during the driving process to thus occupy the FIG. 2 position.

In a modified attachment sequence a quantity 44 of epoxy or other permanent mastic is applied to the post top wall 26 prior to this attachment procedure.

Figure 3:
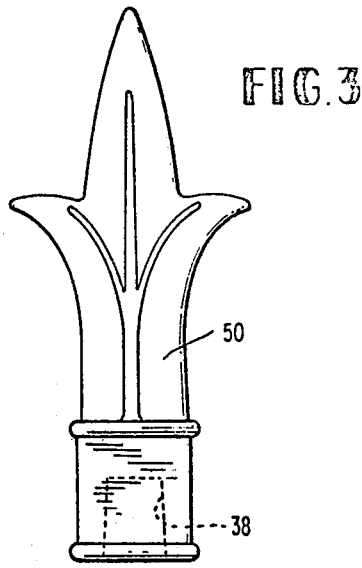
FIG. 3 is a side elevational view, showing a modification of design, and showing the tapered assembly chamber.

The outer configuration of the lower body sections is substantially rectangular. Upper and lower flanges 46 and 48 are provided both for appearance and to rigidify the section. The spear point sections 50 are variable, one design being shown in FIGS. 1 and 2, and another in FIG. 3.

I claim:

1. In a fence construction which includes a longitudinal stringer, and a plurality of substantially vertical metallic posts, said posts being substantially rectangular in cross section, and having upper side portions and top walls, protective and decorative spear points for said posts, and wherein each point comprises:

a spear point body section having upper and lower portions;

the lower body section having top and bottom flanges;

the lower body section having a substantially rectangular chamber, said chamber being defined by inner walls which are inclined from the vertical so that the chamber is of increased dimension at its entry portion;

the chamber having flat top walls;

a spear point section projecting integrally, vertically from the upper portion of each body section;

the body section and spear point section being formed of resilient plastic material; and wherein for each post the lower body section being expandably engaged on the respective upper side portions of a corresponding post with the chamber expanded throughout its depth to frictionally engage the side portions along the complete axial length thereof, with the top wall of the post abutted against the flat top wall of the chamber and an epoxy mastic bonding substance on the end of the post receiving the spear point to permanently adhere the spear point thereon.

* * * * *